(12) United States Patent  (10) Patent No.: US 9,288,539 B2
Johnson                    (45) Date of Patent:     Mar. 15, 2016

(54) SYSTEM AND METHOD FOR A USER INTERFACE TO MANAGE THE RECORDING, DOWNLOADING AND SHARING OF CONTENT FROM MULTIPLE SOURCES

(75) Inventor: Brian David Johnson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 864 days.

(21) Appl. No.: 11/954,825

(22) Filed: Dec. 12, 2007

(65) Prior Publication Data

US 2009/0158325 A1    Jun. 18, 2009

(51) Int. Cl.
 H04N 7/173    (2011.01)
 H04N 21/462   (2011.01)
 H04N 7/16     (2011.01)
 H04N 21/45    (2011.01)
 H04N 21/435   (2011.01)
 H04N 21/235   (2011.01)
 G06F 17/30    (2006.01)
 H04N 21/61    (2011.01)
 H04N 21/63    (2011.01)
              (Continued)

(52) U.S. Cl.
 CPC ...... *H04N 21/4622* (2013.01); *G06F 17/30017* (2013.01); *H04N 7/165* (2013.01); *H04N 7/173* (2013.01); *H04N 7/17318* (2013.01); *H04N 21/235* (2013.01); *H04N 21/435* (2013.01); *H04N 21/4532* (2013.01); *H04N 21/6125* (2013.01); *H04N 21/632* (2013.01); *H04N 21/64322* (2013.01); *H04N 21/8193* (2013.01)

(58) Field of Classification Search
 CPC ............ H04N 7/17318; H04N 21/235; H04N 21/435; H04N 7/165; H04N 7/163; H04N 7/173; H04N 21/4532
 USPC ........................... 725/44–52, 27–28, 93, 116
 See application file for complete search history.

(56) References Cited

U.S. PATENT DOCUMENTS 7,508,419 B2 * 3/2009 Toyama et al. ............ 348/211.3
8,413,198 B2 * 4/2013 Connor et al. ................ 725/105
(Continued)

FOREIGN PATENT DOCUMENTS

CN    1711758    12/2005
CN    1859107    11/2006
(Continued)

OTHER PUBLICATIONS

Office Action received for the Chinese Patent Application No. 200810187173.3, mailed on Apr. 19, 2010, 9 pages of Office Action and 14 pages of English translation.
(Continued)

*Primary Examiner* — Jason Salce
(74) *Attorney, Agent, or Firm* — Garrett IP, LLC (57) ABSTRACT

A system and method for a user interface to manage the recording, downloading and sharing of content from multiple sources are described. Various embodiments allow requesting content from a service provider by a user and receiving a user interface from the service provider, where the user interface indicates the availability of the content via multiple sources, and where the multiple sources include an Internet Protocol (IP) network, a broadcast service and a peer-to-peer network. Other embodiments are described and claimed.

17 Claims, 6 Drawing Sheets (51) Int. Cl.
*H04N 21/643* (2011.01)
*H04N 21/81* (2011.01)

(56) References Cited

U.S. PATENT DOCUMENTS

| | | | |
|---|---|---|---|
| 2002/0138744 A1* | 9/2002 | Schleicher et al. | 713/187 |
| 2002/0154892 A1* | 10/2002 | Hoshen et al. | 386/87 |
| 2003/0118014 A1* | 6/2003 | Iyer et al. | 370/389 |
| 2003/0158958 A1* | 8/2003 | Chiu | 709/231 |
| 2003/0237097 A1* | 12/2003 | Marshall et al. | 725/105 |
| 2005/0246739 A1 | 11/2005 | Davidson | |
| 2006/0037046 A1* | 2/2006 | Simms et al. | 725/56 |
| 2006/0107286 A1* | 5/2006 | Connor et al. | 725/31 |
| 2006/0117351 A1* | 6/2006 | Sanders et al. | 725/50 |
| 2006/0161951 A1 | 7/2006 | Hindle et al. | |
| 2006/0248570 A1 | 11/2006 | Witwer | |
| 2006/0259926 A1* | 11/2006 | Scheelke et al. | 725/48 |
| 2007/0061842 A1* | 3/2007 | Walter et al. | 725/48 |
| 2007/0244983 A1* | 10/2007 | Berger | 709/217 |
| 2007/0250880 A1* | 10/2007 | Hainline | 725/97 |
| 2008/0066112 A1* | 3/2008 | Bailey et al. | 725/58 |
| 2008/0086754 A1* | 4/2008 | Chen et al. | 725/105 |
| 2009/0094646 A1* | 4/2009 | Walter et al. | 725/48 |
| 2009/0113472 A1* | 4/2009 | Sheth et al. | 725/34 |

FOREIGN PATENT DOCUMENTS

| | | |
|---|---|---|
| CN | 1964472 A | 5/2007 |
| CN | 101034995 | 9/2007 |
| CN | 101459820 A | 6/2009 |
| GB | 2455615 A | 6/2009 |
| WO | 2004/052012 A1 | 6/2004 |
| WO | 2004047432 A1 | 6/2004 |

OTHER PUBLICATIONS

Combined Search and Examination Report received for the United Kingdom Patent Application No. 0821828.1, mailed on Mar. 30, 2009, 5 pages.
Office Action from corresponding application filed in China, Application No. 2008101871733; mailed Sep. 28, 2011; 23 pages.
Chinese Office Action Received for Chinese Patent Application No. 200810187173.3 mailed on Jan. 14, 2013, 24 pages of Office Action including 14 pages of English Translation.
Office Action Received for Chinese Patent Application No. 200810187173.3, mailed on Jun. 5, 2012, 8 pages of Office Action and 13 pages of English Translation.
Office Action Received for Chinese Patent Application No. 200810187173.3, mailed on Dec. 3, 2014, 8 pages of English Translation and 6 pages of Chinese Office Action.
Chinese Office Action received for Chinese Patent Application No. 200810187173.3, mailed on Mar. 27, 2015, 10 pages of English Translation and 7 pages of Chinese Office Action.
Office Action received for Chinese Patent Application No. 200810187173.3, mailed on Aug. 31, 2015, 18 pages of English Translation and 13 pages of Chinese Office Action.

* cited by examiner

SYSTEM AND METHOD FOR A USER INTERFACE TO MANAGE THE RECORDING, DOWNLOADING AND SHARING OF CONTENT FROM MULTIPLE SOURCES

BACKGROUND

The importance for a content service provider (e.g., a television service provider) to continuously strive to provide an increased variety of content and options to its subscribers cannot be overstated. No doubt this is one of the reasons why television service providers provide different types of services to their subscribers including on-demand pay-per-view programming, a variety of subscription options for broadcasted programs, subscriber-defined controls such as parental controls and cable modem Internet access.

But still, there are limitations to some of these types of services provided via the content service provider. For example, with on-demand pay-per-view programming a subscriber can request that a program be displayed on his or her television. But, the subscriber is limited to selecting a program that the television service provider has stored on one or more centralized servers. The number of programs that the provider can store on the centralized server(s) is limited by storage space on the server(s) and the bandwidth required to satisfy all of the requests from its subscribers. Regarding broadcasted programs that are included in a subscription with the television service provider, if the subscriber cannot watch a particular program and forgets to record it or did not realize that a program was broadcasted until after the fact, then the subscriber has to wait until the program is broadcasted again in order to view the program.

As discussed above, if a subscriber knows of a particular program that will be broadcasted, then the subscriber can record the program via a personal video recorder (PVR). PVR's allow a user to record a broadcasted program and/or content received from the content service provider for later viewing. Unfortunately, the programs recorded on a PVR can only be viewed locally where the PVR is physically located.

DETAILED DESCRIPTION

Various embodiments may be generally directed to a system and method for a user interface to manage the recording, downloading and sharing of content from multiple sources. In embodiments, a service provider hosts a centralized server that stores information about each of it subscribers (or users) and available content for each of its subscribers to download on demand, record via broadcast and/or share with other subscribers. The service provider compiles a user interface or guide that is provided to a subscriber that informs the subscriber of content that is available via multiple sources. The multiple sources may include content available via an Internet Protocol (IP) network, via broadcast services, via a peer-to-peer (P2P) network, and so forth.

In embodiments, the service provider corresponds with the peer-to-peer network where each of its subscribers agrees to provide content that he or she has stored locally. When a subscriber logs into or connects with the service provider, the subscriber informs the service provider about the different content he or she has stored. Thus, the service provider knows at all times what content is currently available for any of its subscribers to download via the peer-to-peer network. Yet, the service provider only keeps some sort of listing of the content and not the content itself. Therefore, the disk storage limitation and bandwidth problems as described above are avoided.

In embodiments, the service provider works with one or more broadcast services (cable, satellite, etc.) to receive schedules of upcoming broadcast content. The service provider keeps a record of the types of subscriptions (if any) each of its subscribers has with the broadcast services. The service provider also keeps a record of subscriber-defined controls (e.g., parental controls) related to the applicable broadcast services. Thus, the service provider knows what and when broadcast content is available to its subscribers for recording via the broadcast services.

In embodiments, the service provider stores/maintains content on one or more servers. Subscribers may download this content via an Internet Protocol (IP) connection or network, for example. The service provider also keeps a record of the types of subscriptions and related subscriber-define controls each of its subscribers has with the service provider. In embodiments, the service provider may store content previously broadcasted by the broadcast services.

The distribution of the requested content is controlled because the service provider hosts the centralized server where subscriber information is stored, the service provider knows which content is included in a particular subscription with the service provider and other broadcast services and knows of subscriber-defined controls (e.g., parental controls) set up by the subscriber. Therefore, the service provider, prior to allowing requested content to be distributed to the subscriber, can determine whether the subscriber has access rights to the requested content and whether the subscriber-defined controls allow for the content to be viewed. In embodiments, the content may also include content available via free television or free web content, for example.

In embodiments, the service provider provides a user interface or guide to the subscriber of all of the possible sources (e.g., IP network, broadcast services, peer-to-peer network, etc.) for the requested content. The service provider may also provide an indication to the subscriber of the best likely source for the subscriber to obtain the requested content. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
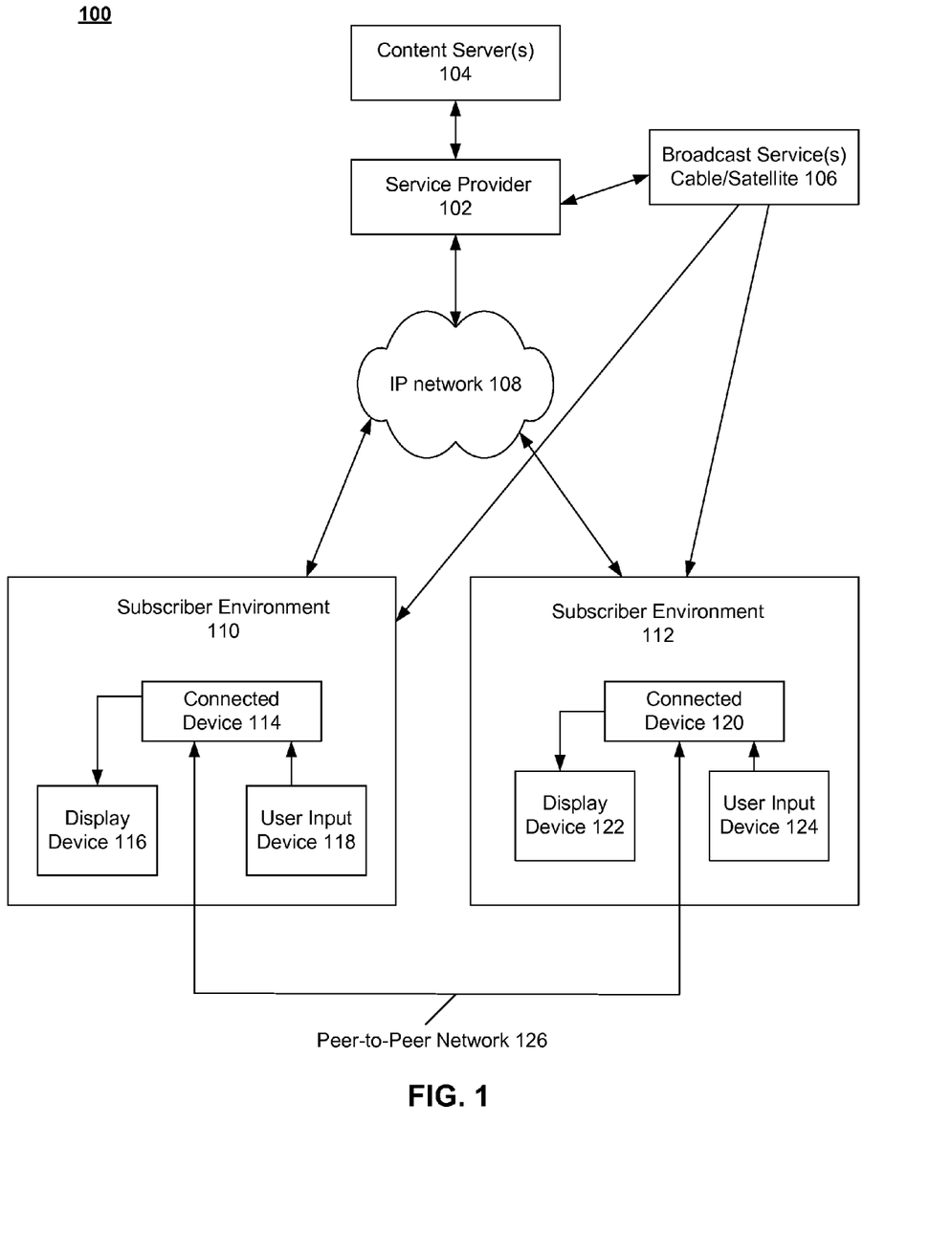
FIG. 1 illustrates one embodiment of a system.

FIG. 1 illustrates an embodiment of a system 100. Referring to FIG. 1, system 100 may comprise a service provider 102, one or more content servers 104, one or more broadcast services 106, an IP network 108, a subscriber environment 110, a subscriber environment 112 and a peer-to-peer network 126. Each of these elements is described next in more detail.

For illustrations purposes only, embodiments of the present invention may be described herein in terms of the service provider being a television service provider and users being subscribers of the service provider. It is important to note that embodiments of the present invention are not limited to facilitating television service providers in the controlled distribution of content. For example, the service provider may also be a music service provider, a photograph service provider, or any company that wants to distribute controlled content. In another embodiment of the invention, the service provider described herein may be generic in the sense that no particular service provider hosts the one or more servers. Here, multiple service providers provide the necessary information to the generic server for the server to provide each of their subscriber's with controlled distribution of content. In other embodiments, the necessary information for the controlled distribution of content may be distributed among multiple devices such as televisions, personal computers, any mobile or ultra-mobile electronic device, and so forth. Furthermore, a subscriber may be any user of embodiments of the invention.

In embodiments, content may be any type of data. In various embodiments, the content may be media information. Examples of media information may generally include any data or signals representing information meant for a user, such as media information, voice information, video information, audio information, image information, textual information, numerical information, alphanumeric symbols, graphics, and so forth. The embodiments are not limited in this context.

In embodiments, service provider 102 may store information about each of its subscribers and available content stored on content servers 104. This content may be downloaded or pushed to subscribers via IP network 108. Service provider 102 may also store information about available content for subscribers to download from other subscribers via peer-to-peer network 126. Service provider 102 may also store information about content to be broadcast via broadcast services 106 and thus recordable by subscribers. In embodiments, content servers 104 may store content that was previously broadcasted by broadcast services 106.

In embodiments, when service provider 102 receives a request for specific content from a subscriber or a request from a subscriber to share content with a second subscriber, provider 102 may generate a user interface or guide that indicates all of the possible sources of the requested content (e.g., via IP network 108, via broadcast services 106, via peer-to-peer network 126, and so forth). Service provider 102 may also indicate in the user interface the likely best source to obtain the requested content. The distribution of the content is controlled by service provider 102, as described above.

Service provider 102 may communicate with subscriber environments 110 and 112 via IP network 108. IP network 108 may be a high speed network or any other type of network suited for the particular application. Other types of networks may be added or substituted as new types of networks are developed.

In embodiments, subscriber environments 110 and 112 each include a connected device 114 and 120, respectively. Connected devices 114 and 120 are each owned, borrowed or licensed by their respective user. Connected devices 114 and 120 are connected to IP network 108 and may communicate with service provider 102 via their unique IP address, for example. In embodiments, connected devices 114 and 120 are connected to peer-to-peer network 126 and thus may communicate with each other via network 126 or network 108. Peer-to-peer network 126 allows content to be shared among subscribers (or connected devices). In embodiments, the term "subscriber" as it is used herein may be referring to a device (e.g., connected device 114 or 120 in FIG. 1). In other embodiments, the term "subscriber" as it is used herein may be referring to the user of a device (e.g., connected device 114 or 120 in FIG. 1).

In embodiments, connected devices 114 and 120 each represent a device that includes not only personal video recorder (PVR) functionality but is also modified to act as a server in peer-to-peer network 126. PVR functionality records television data (i.e., requested content) in digital format (e.g., MPEG-1 or MPEG-2 formats) and stores the data in a hard drive or on a server, for example. The data may also be stored in a distributed manner such as on one or more connected devices throughout a home or office environment. In the case of digital media streams, the PVR functionality routes the previously encoded digital media stream to local storage. PVR functionality of devices 114 and 120 may allow encoding of other types of data and other types of data may be added or substituted for those described as new types of data are developed.

Subscriber environment 110 may also include a display device 116 and a user input device 118. Likewise, subscriber environment 112 may include a display device 122 and a user input device 124.

Display devices 116 and 122 may each be a monitor, projector, a conventional analog television receiver, or any other kind of perceivable video display. The audio portion of the output of the connected devices may be routed through an amplifier, such as an audio/video (A/V) receiver or a sound processing engine, to headphones, speakers or any other type of sound generation device.

User input devices 118 and 124 may be any type of input device suited for a subscriber to communicate with connected devices 114 and 120, respectively.

Although only two subscriber environments are illustrated in FIG. 1, this is not meant to limit the invention. In fact, system 100 may include any number of subscriber environments.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Figure 2:
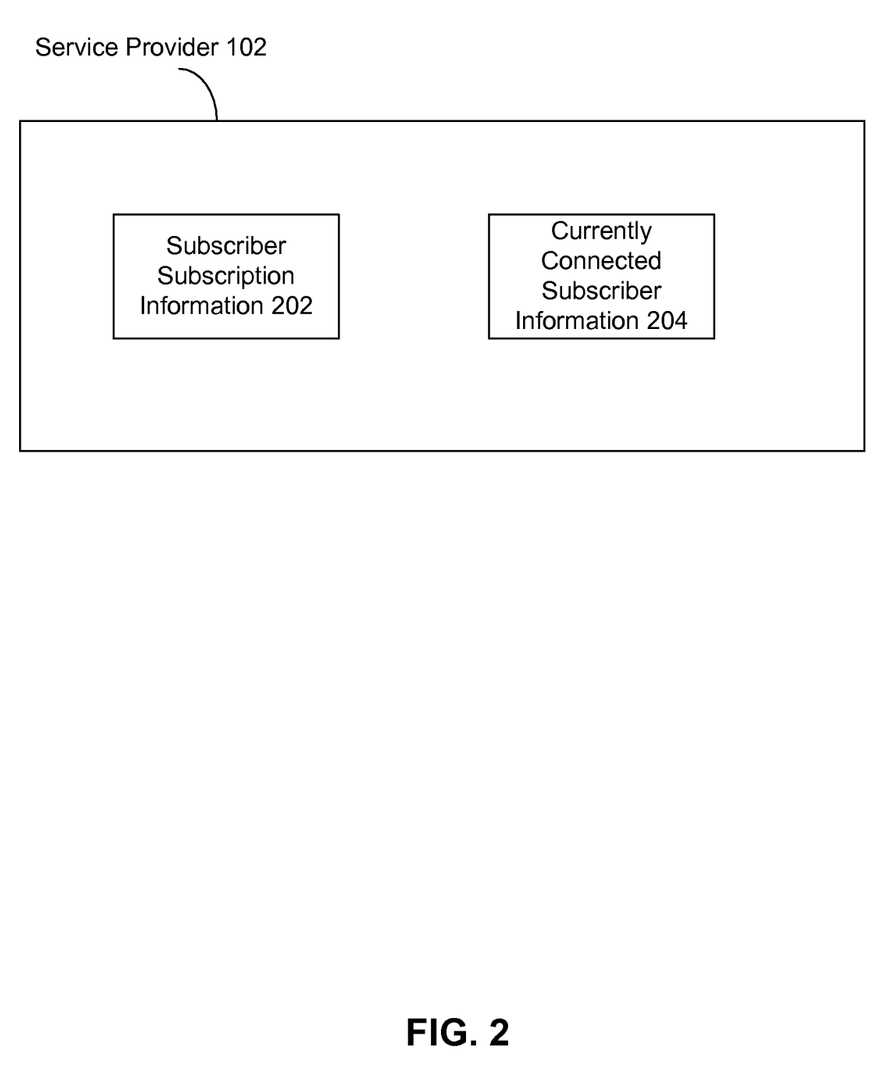
FIG. 2 illustrates one embodiment of a system.

FIG. 2 illustrates one embodiment of the types of subscriber information service provider 102 may utilize in providing requested content to its subscribers via a user interface as described herein. As shown in FIG. 2 and in an embodiment, service provider 102 may include subscriber subscription information 202 and currently connected subscriber information 204. Subscription information 202 may include, but is not necessarily limited to, subscription information, subscriber-defined controls (e.g., parental controls), the network address associated with each subscriber, and so forth. Currently connected subscriber information 204 may include, but is not necessarily limited to, a listing of which subscribers are currently logged into service provider 102 and a listing of the content stored on each of the subscribers.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 3:
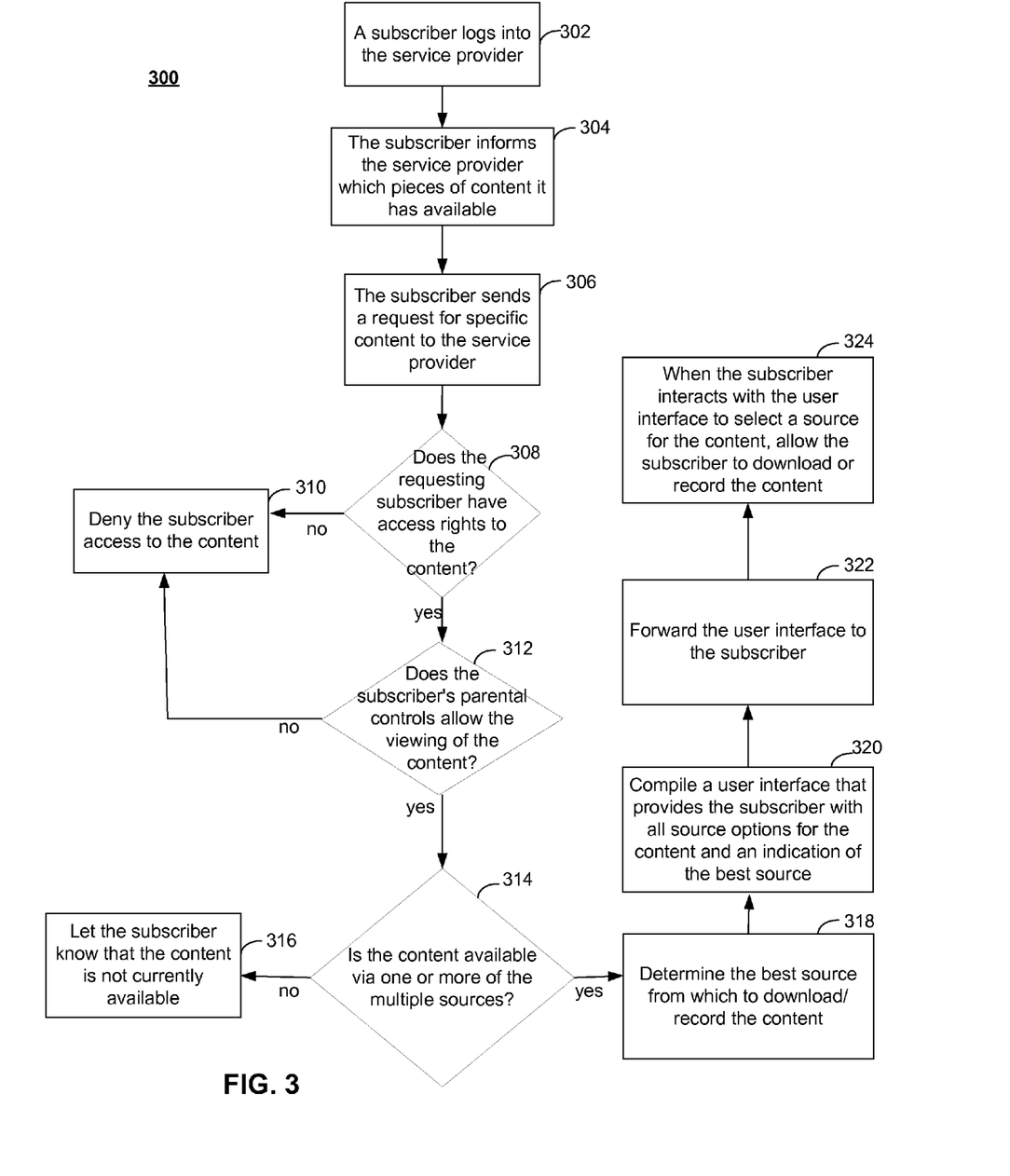
FIG. 3 illustrates one embodiment of a logic flow.

FIG. 3 illustrates one embodiment of a logic flow 300. As shown in logic flow 300, a subscriber logs into a service provider (such as service provider 102 from FIG. 1) (block 302). The subscriber informs the service provider of the pieces of content it has stored and thus available to other subscribers (block 304).

The subscriber sends a request to the service provider for specific content (block 306). The service provider determines whether the subscriber has access rights to the content (block 308). For example, the service provider might determine that the subscriber already has access rights to the requested content (e.g., the requested content is included in the subscriber's service agreement with the service provider or the broadcast services). Alternatively, if the subscriber does not have access rights to the requested content, then the service provider might determine whether the requested content is a pay-per-view program. If so, then the subscriber is charged for the requested content prior to having access rights. The example is provided for illustration purposes only and is not meant to limit embodiments of the invention.

If the subscriber does not have access rights to the content, then the service provider denies the subscriber's request (block 310). The service provider determines whether the subscriber's parental controls allow the viewing of the content (block 312). If not, then the service provider denies the subscriber's request (block 310).

If the subscriber has access rights to the content and its parental controls allow the viewing of the content, then the service provider determines whether the content is available via one or more sources (block 314). In embodiments, the one or more sources may include via an IP network, via broadcast services and via a peer-to-peer network (such as IP network 108, broadcast services 106 and peer-to-peer network 126 as described above with reference to FIG. 1).

If the content is not available, then the service provider informs the subscriber that the content is not currently available (block 316). In embodiments, the service provider may inform the subscriber when the content becomes available in the future.

If the content is available, then the service provider may try to determine the best source from which to download or record the content (block 318). For example, assume that the service provider determined that the content is available via the IP network and the service provider itself, via a broadcast service and via the peer-to-peer network. Assume that the content may be scheduled to be broadcasted the next day, but this may not be the best source if the subscriber wants the content now. Further assume that the service provider has the content stored on its server but is experiencing an unusually high volume of requests. Here, the availability of the content for the subscriber to download will be delayed. Further assume that the service provider determines that a second subscriber in the peer-to-peer network is currently logged in and has the content available immediately for download. Hence, in this example, the service provider might determine that the second subscriber via the peer-to-peer network is the best source for the content if the subscriber wants the content as soon as possible. This example is provided for illustration purposes only and is not meant to limit the invention.

The service provider then compiles a user interface or guide for the subscriber that includes a link or trigger for each of the available sources and an indication of when the content will be available to the subscriber. The service provider may also provide an indication in the user interface of the likely best source for the content (block 320). The user interface is then forwarded to the subscriber (block 322).

When the subscriber interacts with the user interface to select a source for the content, the subscriber is allowed to download or record the content when it is available (block 324). In embodiments, the selection of a source via the user interface may be accomplished via a mouse, pointing device, remote control, etc. These examples are provided for illustration purposes only and are not meant to limit the invention.

The functionality for the subscriber to obtain the content might be via a local module (software and/or hardware) stored by the subscriber (e.g., stored in connected device 114, for example), it might be via a module (software and/or hardware) stored by the service provider, or it may be some combination of both. For example, if the subscriber activates the link or trigger to download the content via the second subscriber and the peer-to-peer network, then in order to facilitate the download of the requested program the service provider may implement a variety of data flow connections. For example, the service provider may send a command to the second subscriber (e.g., to connected device 120, for example) to download the content to the requesting subscriber. Alternatively, the service provider may send a uniform resource locator (URL) to the requesting subscriber to access the content on the second subscriber.

In a similar manner, if the subscriber activates the link or trigger to obtain the content via the service provider itself, then the service provider may either push the content to the subscriber when it is available or the subscriber may be provided with a URL that may be used to access and download the content.

If the subscriber activates the link or trigger to obtain the content via a broadcast service, then the subscriber may be automatically scheduled to record the broadcast of the content. These examples are not meant to limit the invention.

In embodiments, the interaction with the user interface is much like that of a PVR device. Except here the content may be available to the subscriber from a number of different sources and is not limited to the recording of broadcast content. In embodiments, the subscriber might request the content from all available sources (e.g., activate all available sources on the user interface). When the content is delivered via one of the sources, the requests to obtain the content from the remaining sources are automatically deactivated. In other embodiments, if the subscriber requests to obtain the content from one source and for some reason that request cannot be activated or completed, an alternative source for the content may be automatically activated.

Figure 4:
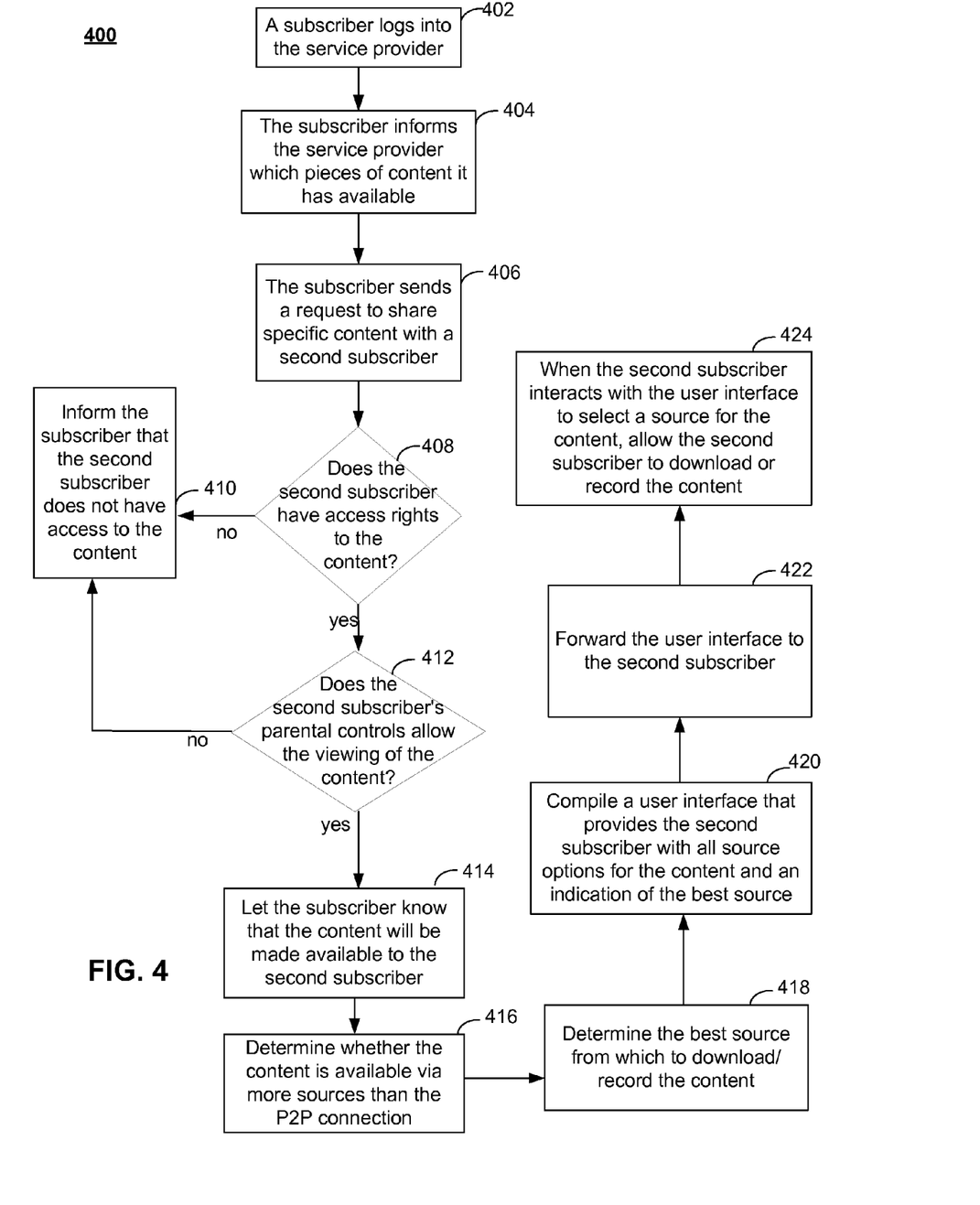
FIG. 4 illustrates one embodiment of a logic flow.

FIG. 4 illustrates one embodiment of a logic flow 400. As shown in logic flow 400, a subscriber logs into the service provider (block 402). The subscriber informs the service provider of the pieces of content it has stored and thus available to other subscribers (block 404).

The subscriber sends a request to the service provider to share specific content it has with a second subscriber (block 406). The service provider determines whether the second subscriber has access rights to the content (block 408). The operation of block 408 may be similar to block 308 as described above.

If the second subscriber does not have access rights to the content, then the service provider informs the subscriber that the second subscriber does not have access to the content (block 410). Otherwise, the service provider determines whether the second subscriber's parental controls allow the viewing of the content (block 412). If not, then the service provider denies the subscriber's request (block 410).

If the second subscriber has access rights to the content and its parental controls allow the viewing of the content, the service provider informs the subscriber that the content will be made available to the second subscriber (block 414).

The service provider determines whether the content is available via another source other than the requesting subscriber and the peer-to-peer network (block 416). The operation of block 416 may be similar to block 314 as described above.

If the content is available via multiple sources, then the service provider may try to determine the best source from which to download or record the content (block 418). The operation of block 418 may be similar to block 318 as described above.

The service provider then compiles a user interface or guide for the second subscriber that includes a link or trigger for each of the available sources and an indication of when the content will be available. The service provider may also provide an indication in the user interface of the likely best source for the content, if applicable (block 420). The user interface is then forwarded to the second subscriber (block 422).

When the second subscriber interacts with user interface to select a source for the content, the second subscriber is allowed to download or record the content when it is available (block 424). The operation of block 424 may be similar to block 324 as described above.

Figure 5:
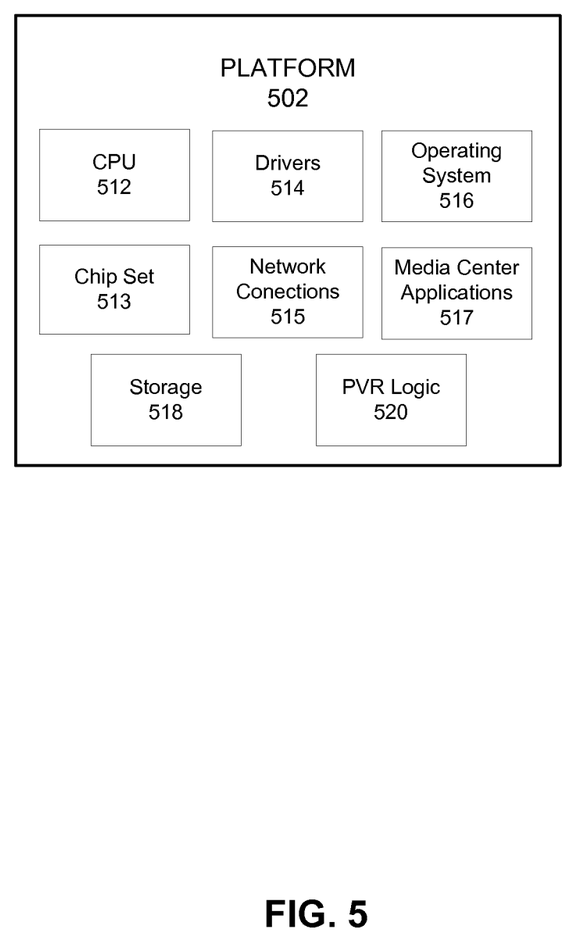
FIG. 5 illustrates one embodiment of a system.

FIG. 5 illustrates an embodiment of a platform 502 (e.g., connected devices 114 or 120 from FIG. 1). In one embodiment, platform 502 may comprise or may be implemented as a media platform 502 such as the Viiv™ media platform made by Intel® Corporation. In one embodiment, platform 502 may interact with the service provider (such as service provider 102 and content servers 104 via IP network 108 from FIG. 1) and with other subscriber environments (such as subscriber environments 110 or 112 via peer-to-peer network 126 from FIG. 1).

In one embodiment, platform 502 may comprise a CPU 512, a chip set 513, one or more drivers 514, one or more network connections 515, an operating system 516, and/or one or more media center applications 517 comprising one or more software applications, for example. Platform 502 also may comprise storage 518.

In one embodiment, CPU 512 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 513 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 514 may comprise the Quick Resume Technology Drivers made by Intel® to enable users to instantly turn on and off platform 502 like a television with the touch of a button after initial boot-up, when enabled, for example. In addition, chip set 513 may comprise hardware and/or software support for 5.1 surround sound audio and/or high definition 7.1 surround sound audio, for example. Drivers 514 may include a graphics driver for integrated graphics platforms. In one embodiment, the graphics driver may comprise a peripheral component interconnect (PCI) Express graphics card.

In one embodiment, network connections 515 may comprise the PRO/1000 PM or PRO/100 VE/VM network connection, both made by Intel® Corporation.

In one embodiment, operating system 516 may comprise the Windows® XP Media Center made by Microsoft® Corporation. In other embodiments, operating system 516 may comprise Linux®, as well as other types of operating systems. In one embodiment, one or more media center applications 517 may comprise a media shell to enable users to interact with a remote control from a distance of about 10-feet away from platform 502 or a display device, for example. In one embodiment, the media shell may be referred to as a "10-feet user interface," for example. In addition, one or more media center applications 517 may comprise the Quick Resume Technology made by Intel®, which allows instant on/off functionality and may allow platform 502 to stream content to media adaptors when the platform is turned "off."

In one embodiment, storage 518 may comprise the Matrix Storage technology made by Intel® to increase the storage performance enhanced protection for valuable digital media when multiple hard drives are included. In one embodiment, PVR logic 520 is used to enable the functionality of the invention as described herein. The embodiments, however, are not limited to the elements or in the context shown or described in FIG. 5.

Platform 510 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
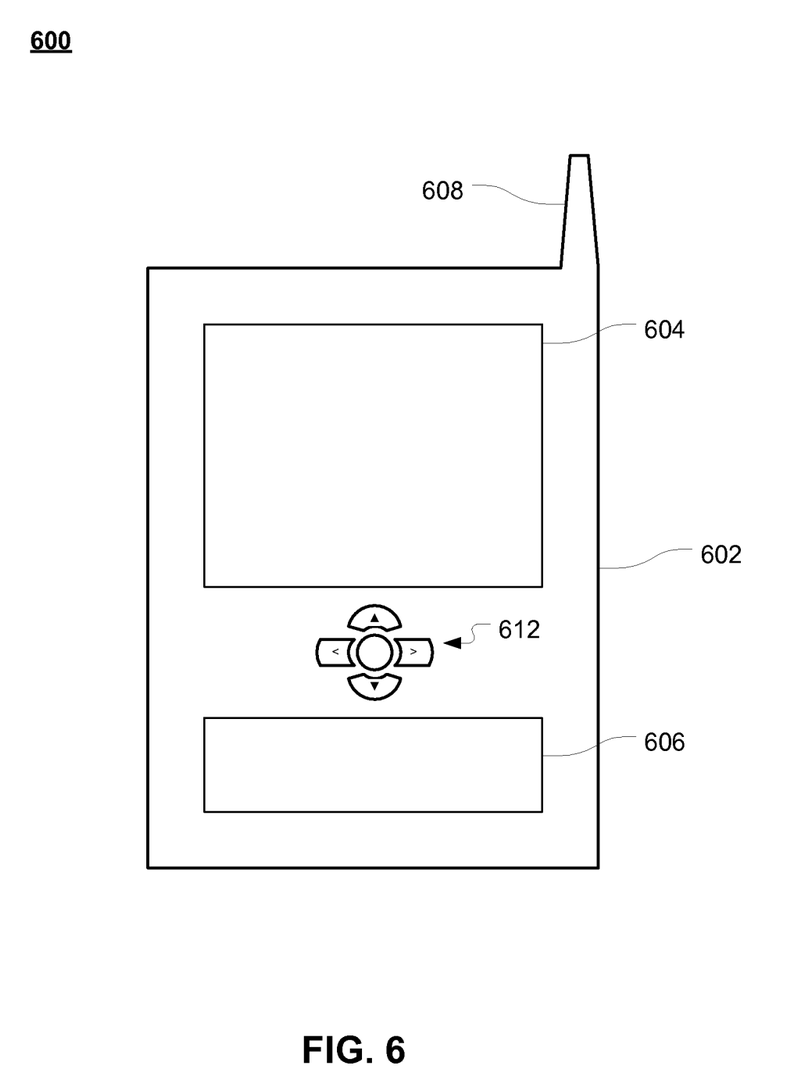
FIG. 6 illustrates one embodiment of a device.

FIG. 6 illustrates one embodiment of a device 600 in which functionality of the present invention as described herein may be implemented. In one embodiment, for example, device 600 may comprise a communication system. In various embodiments, device 600 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, and so forth. The embodiments are not limited in this context.

In one embodiment, device 600 may be implemented as part of a wired communication system, a wireless communication system, or a combination of both. In one embodiment, for example, device 600 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise a five-way navigation button 612. I/O device 606 may comprise a suitable keyboard, a microphone, and/or a speaker, for example. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
controlling distribution of content to and amongst devices of multiple users, including,
selectively authorizing users to access content based on requests of the respective users, subscription-based access restrictions associated with the respective content, and subscription information associated with the respective users, and
selectively authorizing users to access content of devices of other users based on requests of the respective other users, subscription-based access restrictions associated with the respective content, and subscription information associated with the users to be authorized;
identifying one or more sources of authorized content for which a user is authorized to access from amongst devices of other users and one or more of a server and a distribution schedule of a content provider; and
configuring a user interface to permit the user to elect to receive the authorized content from each identified source of the authorized content;
wherein the content includes copies of content distributed by a content provider;
wherein distribution of content from the server to the devices of the user and distribution of content amongst the devices of the users is managed by a content redistribution service provider;
wherein one or more of the users has a subscription with the content provider;
wherein one or more of the users has a subscription with the content redistribution service provider; and
wherein the controlling distribution further includes authorizing the user to access content if the user has a subscription with at least one of the content provider and the content redistribution service provider and the content is included within the subscription.

2. The method of claim 1, wherein:
the content includes copies of content distributed by a first content provider and copies of content distributed by a second content provider;
one or more of the users has a subscription with the first content provider;
one or more of the users has a subscription with the second content provider; and
the controlling distribution further includes authorizing the user to access content if the user has a subscription with at least one of the first and second content providers and the content is included within the subscription.

3. The method of claim 1, wherein:
the selectively authorizing users to access content of devices of other users includes receiving a request from a first user to share selected content of a device of the first user with a second user and selectively authorizing the first user to access the selected content based on an access restriction associated with the selected content and subscription information associated with the first user; and
the identifying includes identifying a source of the selected content in addition to the device of the first user.

4. The method of claim 1, wherein the configuring includes configuring the user interface to permit the user to elect to receive the authorized content at a device of the user concurrently from each of multiple sources, and wherein the method further includes:
terminating transfer of the authorized content from a first user-elected source to the device of the user upon completion of transfer of the authorized content from a second user-elected source to the device of the user.

5. The method of claim 1, wherein the configuring includes:
configuring the user interface to permit the user to elect to elect to record the authorized content from a scheduled broadcast of a content provider and to elect to receive the authorized content from one or more of the server over a packet-based network and a device of one or more other users over a packet-based peer-to-peer network.

6. The method of claim 1, wherein the configuring includes:
configuring the user interface to permit the user to elect to pay to access content if the user is not authorized to access the content and the content complies with a user-configurable subject matter restriction associated with the user.

7. A non-transitory computer readable medium encoded with a computer program, including instructions to cause a processor to:
control distribution of content to and amongst devices of multiple users, including to,
selectively authorize users to access content based on requests of the respective users, subscription-based access restrictions associated with the respective content, and subscription information associated with the respective users, and
selectively authorize users to access content of devices of other users based on requests of the respective other users, subscription-based access restrictions associated with the respective content, and subscription information associated with the users to be authorized;
identify one or more sources of authorized content for which a user is authorized to access from amongst devices of other users and one or more of a server and a distribution schedule of a content provider; and
configure a user interface to permit the user to elect to receive the authorized content from each identified source of the authorized content;
wherein the content includes copies of content distributed by a content provider;
wherein distribution of content from the server to the devices of the user and distribution of content amongst the devices of the users is controlled by a content redistribution service provider;
wherein one or more of the users has a subscription with the content provider;
wherein one or more of the users has a subscription with the content redistribution service provider; and
wherein the instructions include instructions to cause the processor to authorize the user to access content if the user has a subscription with at least one of the content provider and the content redistribution service provider and the content is included within the subscription.

8. The non-transitory computer readable medium of claim 7, wherein:
the content includes copies of content distributed by a first content provider and copies of content distributed by a second content provider;
one or more of the users has a subscription with the first content provider;

one or more of the users has a subscription with the second content provider; and the instructions include instructions to cause the processor to authorize the user to access content if the user has a subscription with at least one of the first and second content providers and the content is included within the subscription.

9. The non-transitory computer readable medium of claim 7, further including instructions to cause the processor to:
receive a request from a first user to share selected content of a device of the first user with a second user;
selectively authorize the first user to access the selected content based on an access restriction associated with the selected content and subscription information associated with the first user; and
identify a source of the selected content in addition to the device of the first user.

10. The non-transitory computer readable medium of claim 7, further including instructions to cause the processor to:
configure the user interface to permit the user to elect to receive the authorized content at a device of the user concurrently from each of multiple sources; and
terminate transfer of the authorized content from a first user-elected source to the device of the user upon completion of transfer of the authorized content from a second user-elected source to the device of the user.

11. The non-transitory computer readable medium of claim 7, further including instructions to cause the processor to:
configure the user interface to permit the user to elect to record the authorized content from a scheduled broadcast of a content provider and to elect to receive the authorized content from one or more of the server over a packet-based network and a device of one or more other users over a packet-based peer-to-peer network.

12. The non-transitory computer readable medium of claim 7, further including instructions to cause the processor to:
configure the user interface to permit the user to elect to pay to access content if the user is not authorized to access the content and the content complies with a user-configurable subject matter restriction associated with the user.

13. An apparatus, comprising a processor and memory configured to:
control distribution of content to and amongst devices of multiple users, including to,
selectively authorize users to access content based on requests of the respective users, subscription-based access restrictions associated with the respective content, and subscription information associated with the respective users, and
selectively authorize users to access content of devices of other users based on requests of the respective other users, subscription-based access restrictions associated with the respective content, and subscription information associated with the users to be authorized;
identify one or more sources of authorized content for which a user is authorized to access from amongst devices of other users and one or more of a server and a distribution schedule of a content provider; and
configure a user interface to permit the user to elect to receive the authorized content from each identified source of the authorized content:
wherein the content includes copies of content distributed by a content provider;
wherein distribution of content from the server to the devices of the user and distribution of content amongst the devices of the users is controlled by a content redistribution service provider;
wherein one or more of the users has a subscription with the content provider;
wherein One or more of the users has a subscription with the content redistribution service provider; and
wherein the processor and memory are further configured to authorize the user to access content if the user has a subscription with at least one of the content provider and the content redistribution service provider and the content is included within the subscription.

14. The apparatus of claim 13, wherein:
the content includes copies of content distributed by a first content provider and copies of content distributed by a second content provider;
one or more of the users has a subscription with the first content provider;
one or more of the users has a subscription with the second content provider; and
the processor and memory are further configured to authorize the user to access content if the user has a subscription with at least one of the first and second content providers and the content is included within the subscription.

15. The apparatus of claim 13, wherein the processor and memory are further configured to:
receive a request from a first user to share selected content of a device of the first user with a second user;
selectively authorize the first user to access the selected content based on an access restriction associated with the selected content and subscription information associated with the first user; and
identify a source of the selected content in addition to the device of the first user.

16. The apparatus of claim 13, wherein the processor and memory are further configured to:
configure the user interface to permit the user to elect to receive the authorized content at a device of the user concurrently from each of multiple sources; and
terminate transfer of the authorized content from a first user-elected source to the device of the user upon completion of transfer of the authorized content from a second user-elected source to the device of the user.

17. The apparatus of claim 13, wherein the processor and memory are further configured to:
configure the user interface to permit the user to elect to record the authorized content from a scheduled broadcast of a content provider and to elect to receive the authorized content from one or more of the server over a packet-based network and a device of one or more other users over a packet-based peer-to-peer network.

* * * * *